United States Patent [19]

Spiro

[11] 4,361,864
[45] Nov. 30, 1982

[54] VEHICLE LIGHT WITH FASTENER ARRANGEMENT

[76] Inventor: Lloyd W. Spiro, 20510 Napa St., Canoga Park, Calif. 91306

[21] Appl. No.: 244,237

[22] Filed: Mar. 16, 1981

[51] Int. Cl.³ .............................................. B64F 1/20
[52] U.S. Cl. ...................................... 362/62; 362/80; 362/310; 362/311; 362/368
[58] Field of Search ................... 362/61, 62, 80, 308, 362/310, 311, 368, 370

[56] References Cited

U.S. PATENT DOCUMENTS

| | | | |
|---|---|---|---|
| 2,257,127 | 9/1941 | Roper et al. | 362/62 |
| 2,557,396 | 6/1951 | Snell | 362/62 X |
| 3,059,105 | 10/1962 | Roe et al. | 362/61 |
| 3,102,993 | 9/1963 | Jensen | 362/62 X |
| 3,255,343 | 6/1966 | Kloss | 362/62 X |
| 3,309,644 | 3/1967 | Zubko | 362/80 X |
| 3,428,941 | 2/1969 | Hewes | 362/62 X |
| 4,156,272 | 5/1979 | Wandler | 362/370 X |
| 4,245,281 | 1/1981 | Ziaylek, Jr. | 362/80 X |

FOREIGN PATENT DOCUMENTS 777341  6/1978  U.S.S.R. ............................. 362/62

*Primary Examiner*—Peter A. Nelson

[57] ABSTRACT

A vehicle light having a lightweight tubular housing secured to a mounting strip by a single fastener and engagement by a flange of said mounting strip with said mounting strip being secured to a vehicle by only two fasteners, one of which also serves to secure a 12-volt direct current high intensity lamp to said mounting strip.

3 Claims, 4 Drawing Figures

U.S. Patent   Nov. 30, 1982   4,361,864
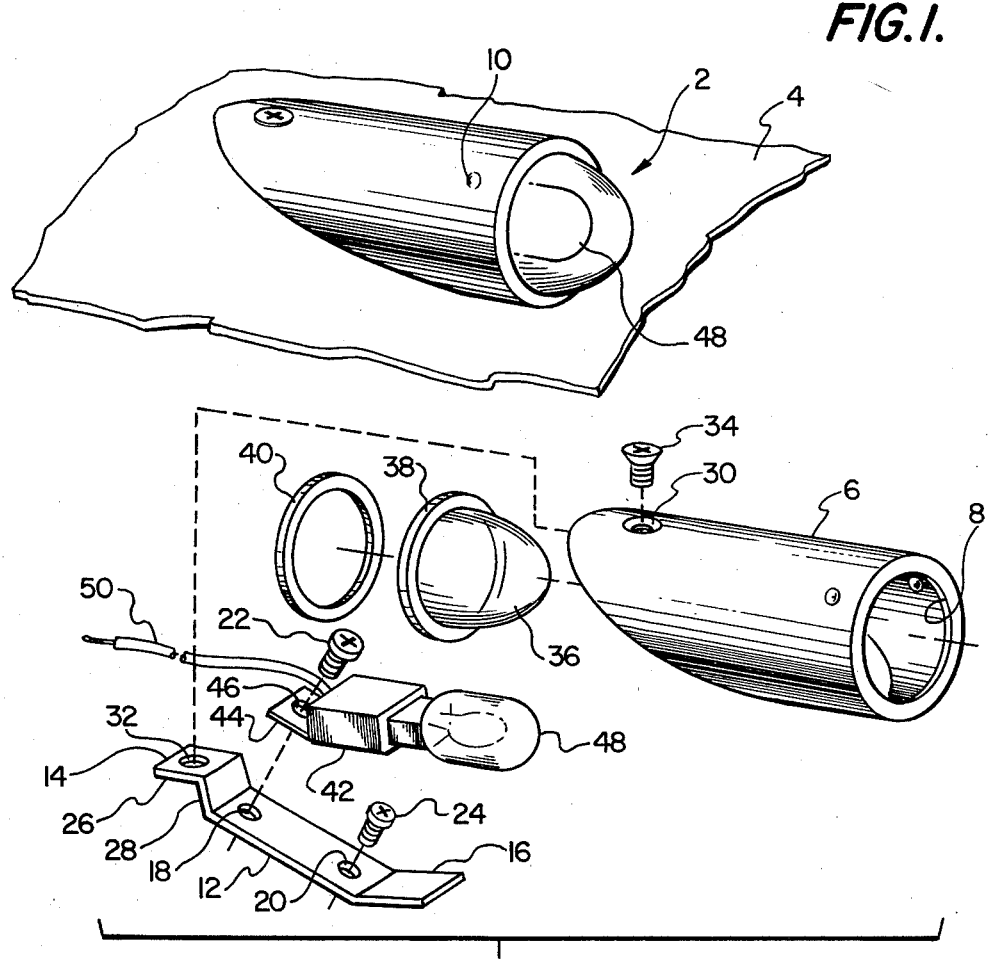
FIG.1.
FIG.2.
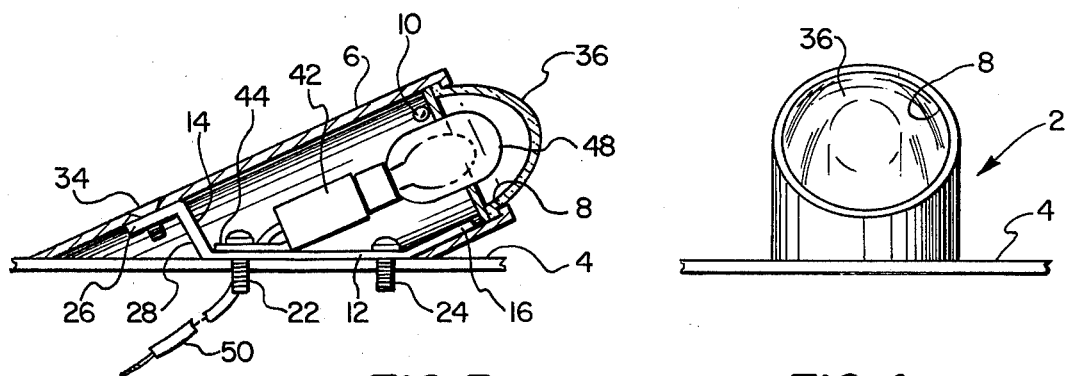
FIG.3.
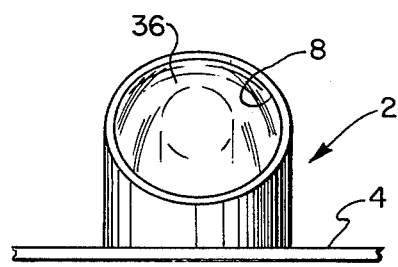
FIG.4.

VEHICLE LIGHT WITH FASTENER ARRANGEMENT

BACKGROUND OF THE INVENTION

1. Field of the Invention

This invention relates to vehicle lighting means and is particularly directed to means for illuminating vehicle exteriors, such as the fuselage, empennage and wings of aircraft.

2. Description of the Prior Art

Pilots operating under Visual Flight Rules are required to keep a constant lookout for other aircraft in order to avoid mid-air collisions. However, smog, haze, dusk and night often make aircraft extremely difficult to see. To alleviate this problem, aircraft have, for many years, carried position lights on their wingtips and tails. However, such lighting is of minimal effectiveness, especially when flying over heavily populated areas. In recent years, flashing strobe lights have provided some improvement. Unfortunately, strobe lights are relatively bulky and heavy, create substantial drag and consume considerable electric power. Furthermore, while both the position lights and the strobe lights serve to indicate the position of the aircraft to other pilots, neither of these devices actually illuminate the aircraft on which they are mounted, and hence, provide little, if any, information regarding aircraft attitude. Since position lights and strobe lights are traditionally mounted at widely separated locations on an aircraft, the position indication provided by such lights is only approximate and numerous mid-air collisions have occurred because pilots could only see one of the running lights and could not remember whether the red light was on the right or left wingtip.

Business and commercial aircraft have sometimes provided lights which would illuminate the vertical tail surface. However, these lights have been expensive, bulky and consume substantial electrical power. Consequently, they have not been widely used on private aircraft and even the business and commercial aircraft have tended to use these lights only on the ground, for advertising purposes, rather than in the air for collision avoidance.

BRIEF SUMMARY AND OBJECTS OF THE INVENTION

These disadvantages of the prior art are overcome with the present invention and vehicle lighting means are provided which are compact, economical in cost and power consumption, produce minimal weight and drag penalties and are simple to install in substantially any location on a vehicle, such as an aircraft. Because of these advantages of the lighting means of the present invention, it becomes feasible to illuminate substantially the entire exterior of the aircraft, thereby providing significantly greater visibility to other pilots and positive position identification of the illuminated aircraft. Such illumination also greatly facilitates traffic pattern management by control tower operators and provides numerous additional advantages, such as easier location of downed aircraft.

The advantages of the present invention are preferably attained by providing vehicle lighting means comprising a housing formed of lightweight cylindrical tubing cut at an angle of approximately 25° to its axis to form the base of the housing, the other end of the housing being cylindrical and being upset to form a lens retaining ridge; a mounting bracket formed with a central flat portion engageable with the surface upon which said lighting means is to be mounted and having front and rear flange portions and a brace portion, said flange portions extending parallel to each other and at an angle of approximately 25° to said flat portion, said brace portion connecting the rear end of said flat portion with the front end of said rear flange, said front flange engaging the cylindrical portion of said housing to retain the front end of said housing; a generally hemispherical transparent lens having an external rib engageable by the front flange of said mounting bracket to urge the rib of said lens into substantial engagement with the lens retaining ledge of said housing; a lamp socket having a mounting tab serving to position said lamp socket parallel to the axis of said housing and engageable with said brace portion of said mounting bracket to assure proper lateral and longitudinal positioning of said lamp socket; a high intensity lamp bulb mounted in said socket; and means securing said vehicle lighting means to the surface of a vehicle.

Accordingly, it is an object of the present invention to provide improved vehicle lighting means.

Another object of the present invention is to provide vehicle lighting means which is compact, lightweight, economical and easy to install.

A further object of the present invention is to provide means for illuminating substantially the entire exterior of a vehicle, such as an aircraft.

A specific object of the present invention is to provide vehicle lighting means comprising a housing formed of lightweight cylindrical tubing cut at an angle of approximately 25° to its axis to form the base of the housing, the other end of the housing being cylindrical and being upset to form a lens retaining ledge; a mounting bracket formed with a central flat portion engageable with the surface upon which said lighting means is to be mounted and having front and rear flange portions and a brace portion, said flange portions extending parallel to each other and at an angle of approximately 25° to said flat portion, said brace portion connecting the rear end of said flat portion with the front end of said rear flange, said front flange engaging the cylindrical portion of said housing to retain the front end of said housing; a generally hemispherical transparent lens having an external rib engageable by the front flange of said mounting bracket to urge the rib of said lens into substantial engagement with the lens retaining ledge of said housing; a lamp socket having a mounting tab serving to position said lamp socket parallel to the axis of said housing and engageable with said brace portion of said mounting bracket to assure proper lateral and longitudinal positioning of said lamp socket; a high intensity lamp bulb mounted in said socket; and means securing said vehicle lighting means to the surface of a vehicle.

Another specific object of the present invention is to mount a plurality of vehicle lighting means at locations about the exterior of the vehicle so as to illuminate substantially the entire exterior of said vehicle.

These and other objects and features of the present invention will be apparent from the following detailed description, taken with reference to the accompanying drawing.

BRIEF DESCRIPTION OF DRAWING

In the drawing:

FIG. 1 is an isometric view of the vehicle light of the present invention mounted on a vehicle surface;

FIG. 2 is an exploded view of the vehicle lighting means of FIG. 1;

FIG. 3 is a vertical section through a vehicle lighting means embodying the present invention; and FIG. 4 is a front elevation showing the vehicle lighting means of the present invention mounted on a flat surface; with a curved mounting surface shown in broken lines.

DETAILED DESCRIPTION OF THE INVENTION

In that form of the present invention chosen for purposes of illustration, FIG. 1 shows the vehicle light, indicated generally at 2, mounted on a vehicle surface 4, such as the wing of an airplane. As seen in FIG. 2, the light 2 comprises a housing 6 formed of lightweight material, such as aluminum tubing of 0.050 inch wall thickness cut at an angle of about 25° to its axis. The opposite end of the housing 6 is upset to form a rim 8, best seen in FIG. 3, and a pair of dimples 10 are formed in the upper surface of the housing 6 and project into the interior of the housing 6. The housing 6 is secured to the vehicle by an elongated mounting strip formed with a pair of flanges 14 and 16 projecting from its opposite ends and having a pair of holes 18 and 20 spaced inwardly from the ends of the strip 12 to receive bolts 22 and 24 for securing the vehicle light 2 to the surface 4. Flange 14 is generally L-shaped, having one leg 26 extending parallel to the inner surface of the housing 6 and a second leg 28 extending substantially perpendicular to leg 26 to join leg 26 to the strip 12. Aligned holes 30 and 32 are formed in the housing 6 and flange 14 of mounting strip 12 to receive screw 34 for securing the housing 6 to the mounting strip 12. Flange 16 extends parallel to the wall of housing 6 and engages the inner wall of the housing 6 adjacent its forward end to retain the forward end of housing 6 in the desired position. Flange 16 also serves to retain the bottom of a spherical lens 36. Lens 36 is formed with a peripheral flange 38 which serves to engage rim 8 of housing 6 to prevent forward movement of the lens 36. If desired, a spacer ring 40 may be inserted behind the lens 36 to hold lens 36 more firmly in position. The lamp proper is a high intensity lamp operating on 12-volt direct current, such as that sold commercially by Westinghouse Corporation of Pittsburgh, Pa., under the designation "BT4", using bulbs, such as the Westinghouse No. 921 or No. 912. The lamp has a bulb socket 42 formed with a rearwardly projecting mounting tab 44 and a wire 50 for connection to a suitable power supply, not shown. The mounting tab 44 is bent so as to cause the axis of the socket 42 to coincide with the axis of the housing 6 and is provided with a hole 46 for receiving mounting bolt 22. The rear end of mounting tab 42 engages leg 28 of flange 14 of the mounting strip 12 and serves to prevent lateral disorientation of the socket 42. Bulb 48 is mounted in socket 42 and projects into the interior of spherical lens 36 so that, when illuminated it lights an area of the vehicle surface 4 having an included angle of approximately 120°.

In use, the vehicle light 2 can be mounted by drilling only three small holes in the vehicle surface; one each to receive mounting bolts 22 and 24 and a third to receive the lead in wire 50 of the lamp socket 42. Should it subsequently be desired to remove or relocate the vehicle light 2, the holes in the vehicle surface can readily be plugged, by means of rivets or the like, to preserve the integrity of the vehicle surface.

To select the desired position for mounting the vehicle light 2, it is suggested that the lamp wire 50 be connected to a suitable power source, such as a battery, by a long, flexible wire. In this way, the bulb 48 will be illuminated and the vehicle light 2 can be moved freely about the surface of the vehicle to find a location which will provide the desired lighting coverage of the vehicle surface. This location can then be marked and the three holes may be drilled for mounting the vehicle light 2.

In mounting the vehicle light 2, hole 20 of mounting strip 12 is aligned with the appropriate one of the holes drilled in the vehicle surface 4 and bolt 24 is inserted to secure the front end of the mounting strip 12. Next, bolt 22 is inserted through hole 46 in the mounting tab 42 of lamp socket 42 and through hole 18 of the mounting strip 12 and the appropriate one of the holes drilled in the vehicle surface 4 to secure the lamp socket 42 and the rear end of mounting strip 12. As this is done, the rear end of mounting tab 44 of the lamp socket 42 will engage flange 14 of the mounting strip 12 to assure proper lateral positioning of lamp socket 42. Bulb 44 is then inserted into socket 42 and wire 50 may be inserted through the third of the holes drilled in vehicle surface 4. Thereafter, lens 36 and, if desired, spacing ring 40 may be assembled with housing 6 by inserting them through the rear end of housing 6 and engaging the upper edge of flange 38 of lens 36 with the upper edge of rim 8 of the housing ahead of the dimples 10. Housing 6 is then slid onto mounting strip 12 to cause flange 16 of mounting strip 12 to engage the forward lower end of housing 6 and to secure lens 36 and spacing ring 40 in position. Finally, hole 30 of housing 6 is aligned with hole 32 of flange 14 of mounting strip 12 and screw 34 is inserted to secure housing 6 to the mounting strip 12. Because of the angle of the rear end of housing 6, the opening at the bottom of the housing 6 will be an elongated oval and, hence, permits mounting of the vehicle light 2 on both curved and flat vehicle surfaces, as seen in FIG. 4. When constructed, as described above, the vehicle light 2 weighs less than 1.2 oz. Thus, even when a plurality of the vehicle lights 2 are mounted on a vehicle, the weight penalty will be negligible. Moreover, due to the configuration of the housing 6 and lens 36, the added drag caused by vehicle lights is also minimal. It has been found in practice that, using eight of the vehicle lights of the present invention, substantially the entire fuselage and empennage of an airplane can be illuminated with no noticeable change in the flight characteristics of the plane, while enabling the plane to be clearly identifiable at night, even at distances up to about five miles.

Obviously, numerous variations and modifications can be made without departing from the present invention. Accordingly, it should be clearly understood that the form of the present invention described above and shown in the accompanying drawing is illustrative only and is not intended to limit the scope of the invention.

What is claimed is:
1. A vehicle light comprising:
   a housing formed of lightweight tubular material having the rear end cut at an angle to its axis and having the front end upset to form an inwardly projecting rim;
   a mounting strip having a pair of holes formed therein adjacent the respective ends of said strip and having flange means projecting upwardly from each end of said strip, one of said flange means being generally L-shaped and having one leg extending parallel to said housing and the other leg connecting said one leg with said mounting strip, the other of said flange means extending parallel to said housing and engageable with the forward portion of said housing to retain said housing;

a lamp socket having a rearwardly projecting mounting tab projecting at an angle such as to cause the axis of said socket to coincide with the axis of said housing and having a hole formed in said mounting tab and having a wire for connecting said lamp socket to an energizing source;

first fastener means extending through said hole in said mounting tab and through the hole in said mounting strip adjacent said L-shaped flange to secure said socket to said mounting strip and to secure said mounting strip to a vehicle;

second fastener means extending through the other hole in said mounting strip to secure said strip to a vehicle;

a lamp bulb mounted in said socket; and a spherical lens having an outwardly projecting peripheral flange engageable with the rim of said housing ahead of said dimples and by the end of said other flange of said mounting strip to retain said lens in position; and third fastener means securing said housing to said one flange of said mounting strip.

2. The vehicle light of claim 1 wherein said mounting tab of said socket is engageable with said L-shaped flange of said mounting strip to assure proper lateral positioning of said socket.

3. The vehicle light of claim 1 wherein said bulb is a 12-volt direct current high intensity bulb.

* * * * *